DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 20, 1971

888 O.G. 706

T888,010

FLEXIBLE FILM-FORMING POLYMERS CAPABLE OF INSOLUBILIZATION

Edward P. Abel and Louis M. Minsk, both of 1669 Lake Ave., Rochester, N.Y. 14615

Filed Nov. 18, 1970, Ser. No. 90,809

**Int. Cl. C08g *9/04***

U.S. Cl. 260—72R

No Drawing. 17 Pages Specification

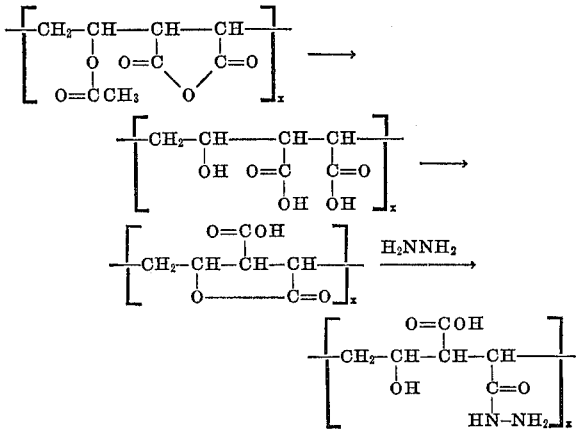

Flexible film-forming polymers which are capable of being insolubilized are obtained by reacting a polymeric $\gamma$-lactone with a diamine such as hydrazine or ethylenediamine. The polymeric $\gamma$-lactones are ester lactones of the type disclosed by U.S. 2,306,071 and U.S. 2,861,056 and are obtained, for example, by polymerizing a mixture of vinyl acetate and maleic anhydride to obtain a heteropolymer which is reacted with water and/or alcohol to obtain the polymeric lactone. The latter is then reacted with the diamine to introduce monoreacted hydrazide groups along the chain. Solutions of the resulting polymer can then be used to form coatings or films which are insolubilized by treatment with a tanning or hardening agent such as formaldehyde. The polymer is especially useful for forming conductive coatings such an antistatic layers for photographic films. For this purpose, it can be used alone or admixed with gelatin or other polymers of similar solubility. The formation of the polymer can be represented as follows: